United States Patent
Babol et al.

(10) Patent No.: US 11,321,106 B2
(45) Date of Patent: May 3, 2022

(54) USING BINARIES OF CONTAINER IMAGES AS OPERATING SYSTEM COMMANDS

(71) Applicant: INTERNATIONAL BUSINESS MACHINES CORPORATION, Armonk, NY (US)

(72) Inventors: Adam Babol, Lubartow (PL); Adam Dyszy, Wodzislaw Slaski (PL); Joanna Wawrzyczek, Cracow (PL); Jakub Blazej Moor, Olkusz (PL); Michal Kmak, Stroze (PL)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/828,260

(22) Filed: Mar. 24, 2020

(65) Prior Publication Data

US 2021/0303322 A1 Sep. 30, 2021

(51) Int. Cl.
*G06F 9/455* (2018.01)

(52) U.S. Cl.
CPC ...... *G06F 9/45529* (2013.01); *G06F 9/45512* (2013.01)

(58) Field of Classification Search
CPC .......... G06F 9/45529; G06F 9/45512
See application file for complete search history.

(56) References Cited

U.S. PATENT DOCUMENTS

| | | | |
|---|---|---|---|
| 6,507,948 B1 * | 1/2003 | Curtis | G06F 8/30 717/174 |
| 2012/0210113 A1 * | 8/2012 | Wood | G06F 21/575 713/2 |
| 2014/0122435 A1 * | 5/2014 | Chavda | G06F 11/1451 707/645 |
| 2015/0301824 A1 * | 10/2015 | Patton | G06F 8/71 717/122 |
| 2016/0371127 A1 * | 12/2016 | Antony | G06F 9/505 |

(Continued)

FOREIGN PATENT DOCUMENTS

| | | |
|---|---|---|
| CN | 106506587 | 3/2017 |
| WO | 2018236567 | 12/2018 |

OTHER PUBLICATIONS

Anonymous, "Prompting User for Updated Docker Image While Pulling Docker Image", IPCOM000259100D, Jul. 12, 2019, 4 pp.

(Continued)

*Primary Examiner* — Michael W Ayers
(74) *Attorney, Agent, or Firm* — Konrad Raynes Davda & Victor LLP; Janaki K. Davda

(57) ABSTRACT

Provided are techniques for using binaries of container images as operating system commands. Metadata describing one or more binaries for a container image is received, where each of the one or more binaries has an associated operating system command. The one or more binaries are integrated with the container image by placing the one or more binaries into the container image. Each operating system command is injected into an operating system by adding each operating system command to a command file accessed by the operating system. In response to receiving an operating system command associated with a binary of the one or more binaries, the container image is pulled using the metadata, the container image is executed with the one or more binaries, and a result is returned.

18 Claims, 7 Drawing Sheets

(56) References Cited

U.S. PATENT DOCUMENTS

2017/0206073 A1* 7/2017 Kirkpatrick ............... G06F 8/65
2018/0357068 A1* 12/2018 Ambichl ................. G06F 9/545
2020/0110695 A1* 4/2020 Maciel ................ G06F 11/3684
2020/0210227 A1* 7/2020 Xie ........................ G06Q 40/00
2021/0294726 A1* 9/2021 Reisinger ............ G06F 9/44521

OTHER PUBLICATIONS

"Docker Pull", [online], [Retrieved on Sep. 30, 2019], Retrieved from the Internet at <URL: https://docs.docker.com/engine/reference/commandline/pull/>, 5 pp.

Mell, P., et al., "Effectively and Securely Using the Cloud Computing Paradigm" dated Oct. 7, 2009, NIST, Information Technology Laboratory, Total 80 pages.

Mell, P., et al., "The NIST Definition of Cloud Computing" dated Sep. 2011, Recommendations of the National Institute of Standards and Technology, Total 7 pages.

Machines Translation of CN Publication No. 106506587, published Mar. 15, 2017, 10 pp.

* cited by examiner

USING BINARIES OF CONTAINER IMAGES AS OPERATING SYSTEM COMMANDS

BACKGROUND

Embodiments of the invention relate to using binaries of container images as operating system commands.

A container may be described as a running instance of a container image, while the container image may be described as an executable unit of software, in which application code is packaged, along with environment variables, configuration files, libraries, and software dependencies, such that the application code is portable and may be run in different environments (e.g., on a desktop computer, on a laptop computer, on a smartphone, on a cloud node, etc.).

Containerization may be described as a process for packing the application code with environment variables, configuration files, libraries, and software dependencies, and the result of this process is the container image that may be run on a container platform.

Containers take advantage of a form of Operating System (OS) virtualization in which features of the OS are leveraged to both isolate processes and control the amount of resources (e.g., processor, memory, and disk) that those processes have access to. That is, containers leverage the features and resources of the host OS.

SUMMARY

In accordance with certain embodiments, a computer-implemented method is provided for using binaries of container images as operating system commands. The computer-implemented method comprises operations. Metadata describing one or more binaries for a container image is received, where each of the one or more binaries has an associated operating system command. The one or more binaries are integrated with the container image by placing the one or more binaries into the container image. Each operating system command is injected into an operating system by adding each operating system command to a command file accessed by the operating system. In response to receiving an operating system command associated with a binary of the one or more binaries, the container image is pulled using the metadata, the container image is executed with the one or more binaries, and a result is returned.

In accordance with other embodiments, a computer program product is provided for using binaries of container images as operating system commands. The computer program product comprises a computer readable storage medium having program code embodied therewith, the program code executable by at least one processor to perform operations. Metadata describing one or more binaries for a container image is received, where each of the one or more binaries has an associated operating system command. The one or more binaries are integrated with the container image by placing the one or more binaries into the container image. Each operating system command is injected into an operating system by adding each operating system command to a command file accessed by the operating system. In response to receiving an operating system command associated with a binary of the one or more binaries, the container image is pulled using the metadata, the container image is executed with the one or more binaries, and a result is returned.

In accordance with yet other embodiments, a computer system is provided for using binaries of container images as operating system commands. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Metadata describing one or more binaries for a container image is received, where each of the one or more binaries has an associated operating system command. The one or more binaries are integrated with the container image by placing the one or more binaries into the container image. Each operating system command is injected into an operating system by adding each operating system command to a command file accessed by the operating system. In response to receiving an operating system command associated with a binary of the one or more binaries, the container image is pulled using the metadata, the container image is executed with the one or more binaries, and a result is returned.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
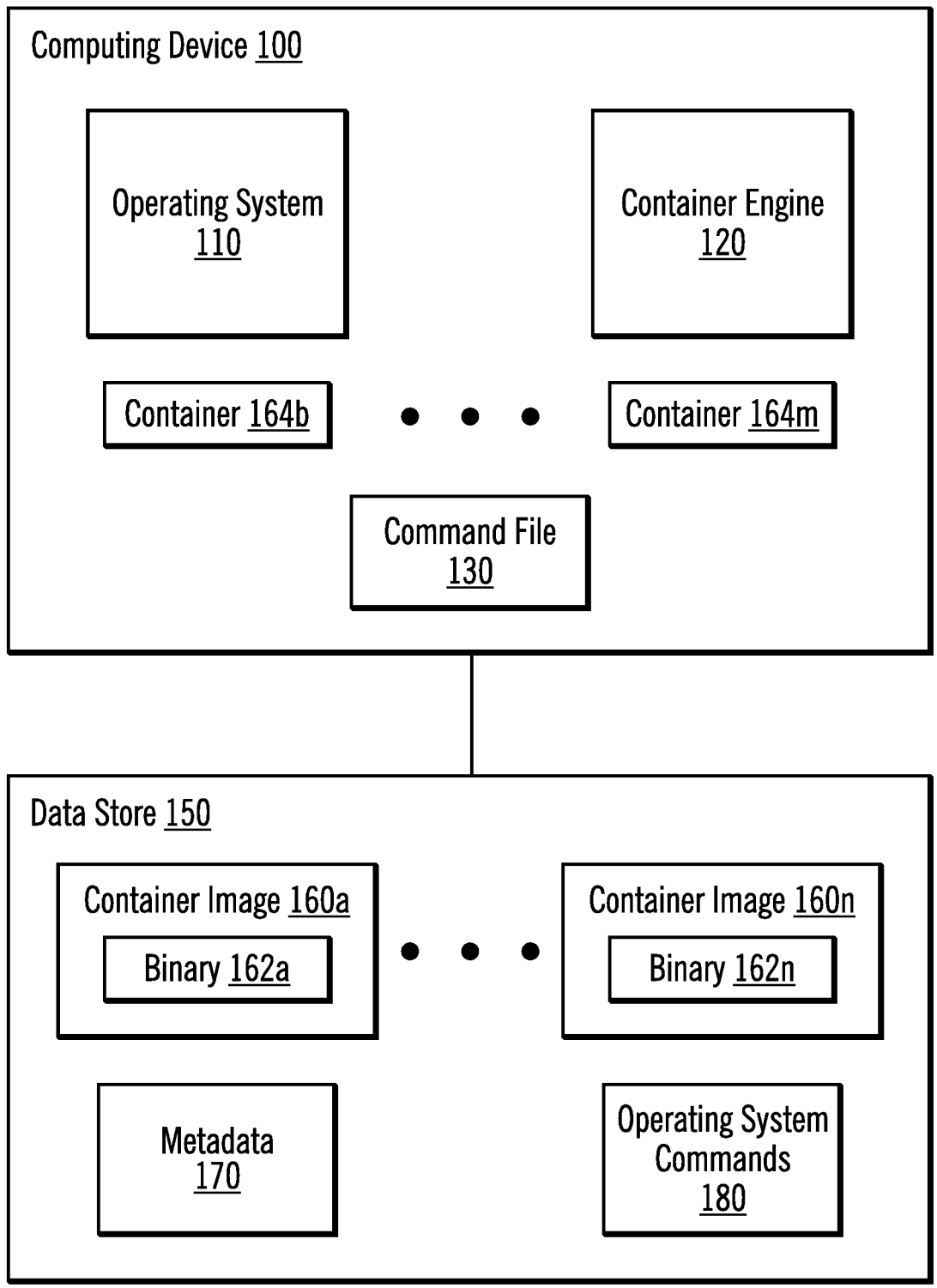
FIG. 1 illustrates, in a block diagram, a computing environment in accordance with certain embodiments.

FIG. 1 illustrates, in a block diagram, a computing environment in accordance with certain embodiments. A computing device 100 includes an operating system 110, a container engine 120, one or more containers 164b . . . 164m, and a command file 130. The computing device 100 is coupled to a data store 150. The data store 150 includes one or more container images 160a . . . 160n, metadata 170, and operating system commands 180. Each container image 160*a* . . . 160*n* includes at least one binary 162*a* . . . 162*n*. Each binary 162*a* . . . 162*n* corresponds to an operating system command 180. When an operating system command 180 is issued, the corresponding binary 162*a* . . . 162*n* is executed with the container image 160*a* . . . 160*n* containing that binary 162*a* . . . 162*n*.

The metadata 170 ("container metadata") indicates which container images 160*a* . . . 160*n* provide which binaries 162*a* . . . 162*n* and specifies the operating system commands 180 used to execute the binaries 162*a* . . . 162*n*. In certain embodiments, the metadata 170 for a container image 160*a* . . . 160*n* may be included in the container image 160*a* . . . 160*n*, while, in other embodiments, the metadata 170 is separate from the container image 160*a* . . . 160*n*.

The container image 160*a* . . . 160*n* may be described as an executable unit of software, in which application code is packaged, along with environment variables, configuration files, libraries, and software dependencies, such that the application code is portable and may be run in different environments (e.g., on a desktop computer, on a laptop computer, on a smartphone, on a cloud node, etc.). Each container 164*b* . . . 164*m* is a running instance of a corresponding container image 160*a* . . . 160*n*. That is, each container 164*b* . . . 164*m* may be described as the run time instance of the corresponding container image 160*a* . . . 160*n*.

The container engine 120 may be described as software that accepts an operating system command 180 from the operating system 110, pulls a container image 160*a* . . . 160*n* for that operating system command 180, and executes the container image 160*a* . . . 160*n* as a container 164*b* . . . 164*m* corresponding to the container image 160*a* . . . 160*n*, where the container image 160*a* . . . 160*n* includes a binary 162*a* . . . 162*n*.

The binaries 162*a* . . . 162*n* (or "application binaries") may be described as software modules, tools or programs. For example, a container image 160*a* . . . 160*n* may contain a binary 162*a* . . . 162*n* that receives a query and returns a query result.

Unlike conventional systems, in which a user may call a binary (from a command line or a command prompt) as long as the user knows what container image to use and how to execute the binary using a container engine command, with embodiments, the container engine 120 integrates the container images 160*a* . . . 160*n* and binaries 162*a* . . . 162*n* so that the binaries may be executed as operating system commands 180 with the user issuing the operating system commands 180 to the operating system 110. That is, the container engine 120 may be described as managing the container images 160*a* . . . 160*n* with metadata 170 indicating the operating system commands 180. The binaries 162*a* . . . 162*n* may be placed inside the container images 160*a* . . . 160*n* and executed implicitly in the same way as other binaries that are not inside container images 160*a* . . . 160*n*. Also, each container image 160*a* . . . 160*n* may include one or more binaries 162*a* . . . 162*n*.

With embodiments, during a build process for the container image 160*a* . . . 160*n*, the developer of the container image 160*a* . . . 160*n* provides metadata 170 with information on what binaries 162*a* . . . 162*n* are available in that container image 160*a* . . . 160*n*. The binaries 162*a* . . . 162*n* are in a format recognized by the container engine 120. Next, the container engine 120 injects operating system commands 180 into the operating system 110 (e.g., a host operating system), and then the operating system commands 180 are available to the user as operating system commands 180. When the user executes such an operating system command 180, the operating system 110 receives the operating system command 180 and invokes the container engine 120. Then, the container engine 120 executes the container 164*b* . . . 164*m* with the binary 162*a* . . . 162*n* that corresponds to the operating system command 180 and returns a result. In certain embodiments, the result is a result of the execution of the operating system command 180, while in other embodiments, the result is a status (e.g., operating system command executed successfully or operating system command failed to execute).

The container engine 120 maps an operating system command 180 to a container image 160*a* . . . 160*n* with the corresponding binary 162*a* . . . 162*n* using the metadata 170. In certain embodiments, the creator of the container image 160*a* . . . 160*n* provides the metadata 170 with the operating system command 180 that corresponds to the binary 162*a* . . . 162*n*.

Figure 2:
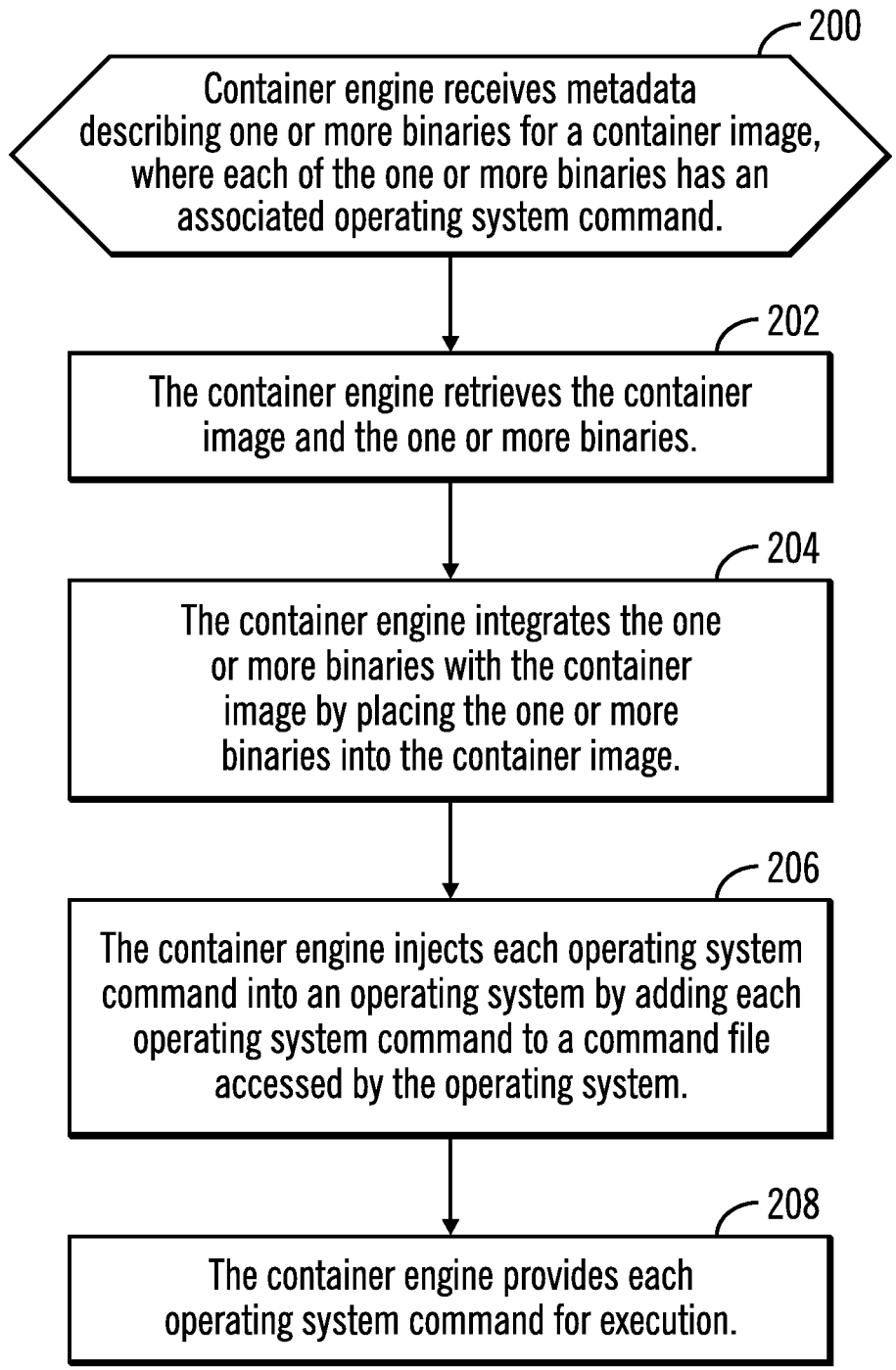
FIG. 2 illustrates, in a flowchart, operations performed by a container engine for providing operating system commands via a container image in accordance with certain embodiments.

FIG. 2 illustrates, in a flowchart, operations performed by a container engine for providing operating system commands via a container image in accordance with certain embodiments. Control begins at block 200 with the container engine 120 receiving metadata 170 describing one or more binaries 162*a* . . . 162*n* for a container image 160*a* . . . 160*n*, where each of the one or more binaries 162*a* . . . 162*n* has an associated operating system command 180. In block 202, the container engine 120 retrieves the container image 160*a* . . . 160*n* and the one or more binaries 162*a* . . . 162*n*. In block 204, the container engine 120 integrates the one or more binaries w162*a* . . . 162*n* with the container image 160*a* . . . 160*n* by placing the one or more binaries 162*a* . . . 162*n* into the container image 160*a* . . . 160*n*.

In block 206, the container engine 120 injects each operating system command 180 into the operating system 110 by adding each operating system command 180 to the command file 130 accessed by the operating system 110. In block 206, the container engine 120 provides each operating system command 180 for execution by a user. In various embodiments, the operating system commands 180 may be provided in a file, via a Graphical User Interface (GUI), etc.

Figure 3:
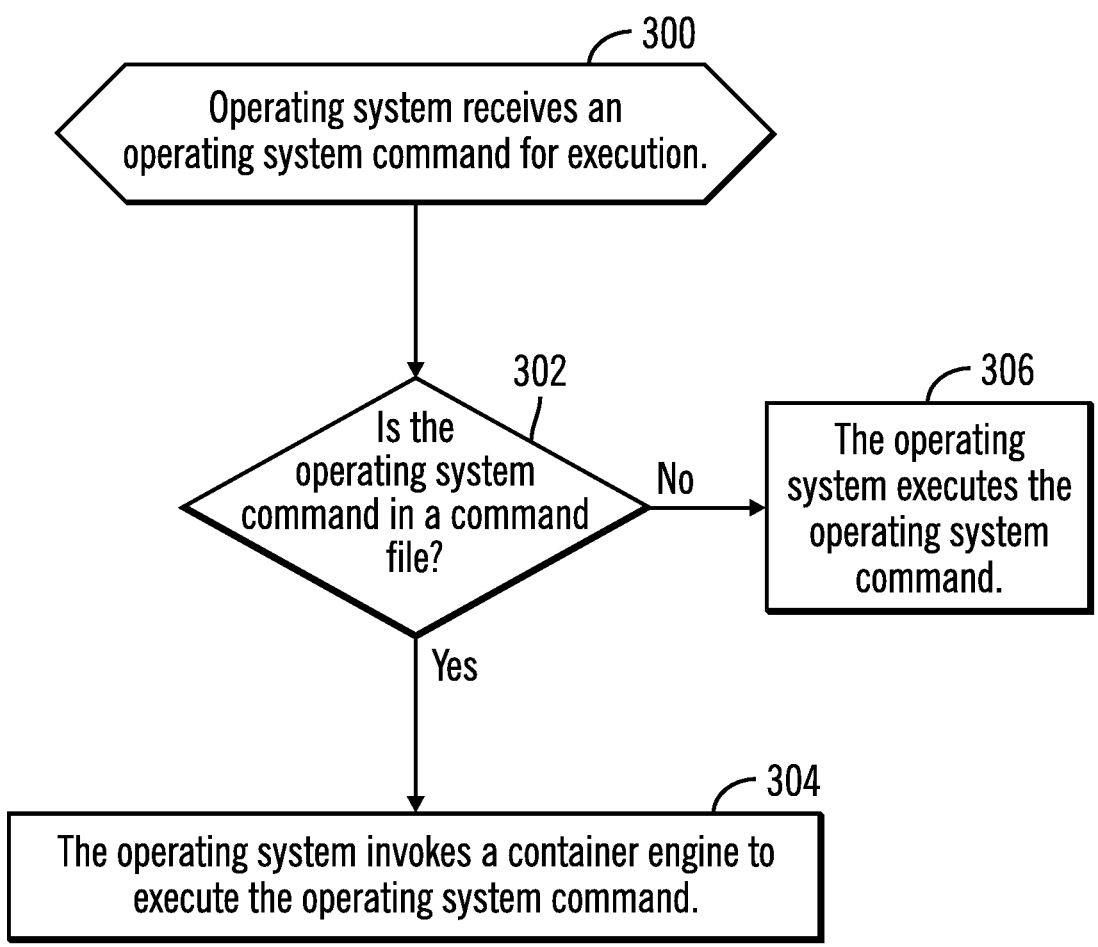
FIG. 3 illustrates, in a flowchart, operations performed by an operating system for executing operating system commands in accordance with certain embodiments.

FIG. 3 illustrates, in a flowchart, operations performed by the operating system 110 for executing operating system commands 180 in accordance with certain embodiments. Control begins at block 300 with the operating system 110 receiving an operating system command 180 for execution. In block 302, the operating system 110 checks the command file 130 to determine whether the operating system command 180 is in the command file 130. If the command file 130 includes the operating system command 180, processing continues to block 304, otherwise, processing continues to block 306. In block 304, the operating system 110 invokes the container engine 120 to execute the operating system command 180. In block 306, the operating system 110 executes the operating system command 180.

Figure 4:
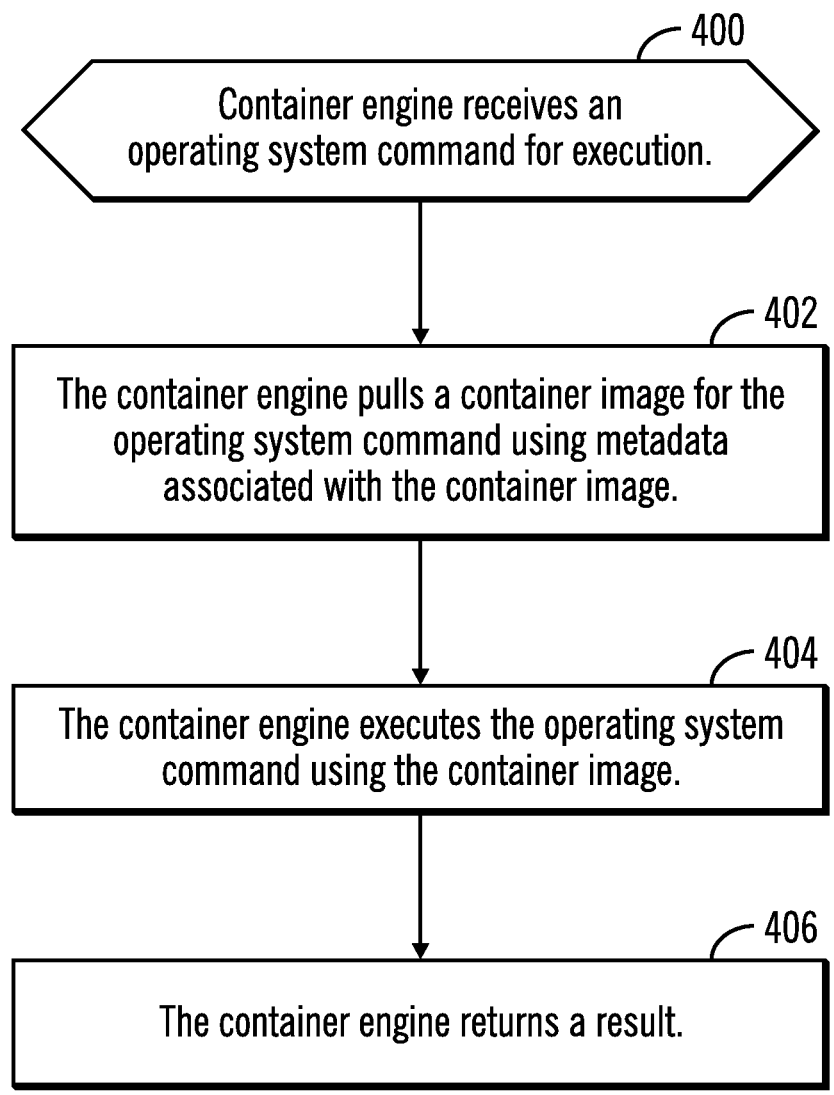
FIG. 4 illustrates, in a flowchart, operations performed by the container engine for using binaries of container images as operating system commands in accordance with certain embodiments.

FIG. 4 illustrates, in a flowchart, operations performed by the container engine for using binaries of container images as operating system commands in accordance with certain embodiments. Because existing binaries may be used as operating system commands, the binaries may be said to be reused.

Control begins at block 400 with the container engine 120 receiving an operating system command 180 for execution. In block 402, the container engine 120 pulls (i.e., identifies and retrieves) a container image 160*a* . . . 160*n* for the operating system command 180 using metadata 170 associated with the container image 160*a* . . . 160*n*. In certain embodiments, the metadata 170 indicates which container image 160*a* . . . 160*n* specifies the operating system command 180 used to execute an associated binary 162a . . . 162n. Therefore, the metadata 170 is used to map the operating system command 180 to the container image 160a . . . 160n to be pulled.

In block 404, the container engine 120 executes the operating system command 180 using the container image 160a . . . 160n. In certain embodiments, an instance of the container image 160a . . . 160n (i.e., a container 164b . . . 164m) is executed by the operating system 110. In block 406, the container engine 120 returns a result of executing the operating system command 180.

In certain embodiments, the container engine 120 injects an operating system command 180 defined as an EXT_CMD into the operating system 110 by putting information about the operating system command 180 into the command file 130 used by the operating system 110. For example, the binary 162a . . . 162n may be for a database query "dquery". With embodiments, an entry is added into the command file 130, such as EXT_CMD/usr/bin/dquery, where the entry indicates an executable binary 162a . . . 162n named "dquery". In certain embodiments, the name of the binary 162a . . . 162n is also the name of the corresponding operating system command 180, so the binary "dquery" corresponds to the operating system command 180 "dquery". In certain embodiments, this entry may be added by the container engine 120 in response to input by a container image publisher. In alternative embodiments, this entry may be added by the container image publisher directly. The command file 130 may be described as a text document that contains an operating system command 180, "dquery", that a user may call (e.g., via a command line or a command prompt). This entry indicates that the binary "dquery" in the container image 160a . . . 160n may be executed by the container engine 120. When a user issues the operating system command 180 for "dquery", the operating system 110 determines whether the operating system command 180 is available in the command file 180, and, if so, the operating system 110 calls the container engine 120 to execute the operating system command 180 "dquery".

In certain embodiments, the container engine 120 receives the operating system command from the operating system 110 and pulls the container image from an images repository. In certain embodiments, the container engine 120, during the pull, checks for the existence of the EXT_CMD entry in the container image.

Thus, the container engine 120 injects operating system commands 180 (e.g., defined as EXT_CMD) into the operating system 110. Then, if the user executes the operating system command 180, the container engine 120 handles the operating system command execution.

Figure 5:
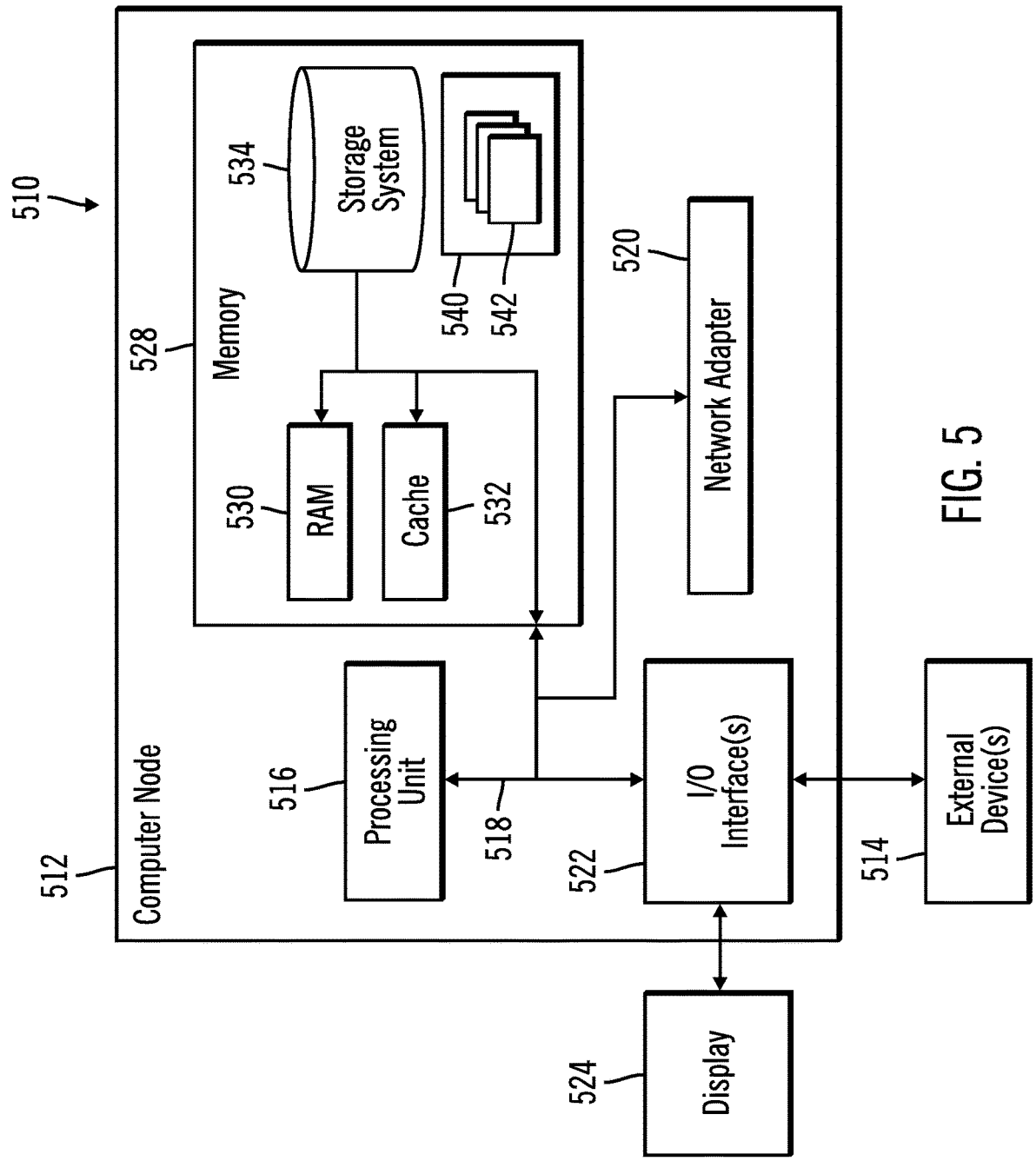
FIG. 5 illustrates a computing node in accordance with certain embodiments.

FIG. 5 illustrates a computing environment 510 in accordance with certain embodiments. In certain embodiments, the computing environment is a cloud computing environment. Referring to FIG. 5, computer node 512 is only one example of a suitable computing node and is not intended to suggest any limitation as to the scope of use or functionality of embodiments of the invention described herein. Regardless, computer node 512 is capable of being implemented and/or performing any of the functionality set forth hereinabove.

The computer node 512 may be a computer system, which is operational with numerous other general purpose or special purpose computing system environments or configurations. Examples of well-known computing systems, environments, and/or configurations that may be suitable for use with computer node 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 512 may be described in the general context of computer system executable instructions, such as program modules, being executed by a computer system. Generally, program modules may include routines, programs, objects, components, logic, data structures, and so on that perform particular tasks or implement particular abstract data types. Computer node 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer node 512 is shown in the form of a general-purpose computing device. The components of computer node 512 may include, but are not limited to, one or more processors or processing units 516, a system memory 528, and a bus 518 that couples various system components including system memory 528 to one or more processors or processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 512 typically includes a variety of computer system readable media. Such media may be any available media that is accessible by computer node 512, and it includes both volatile and non-volatile media, removable and non-removable media.

System memory 528 can include computer system readable media in the form of volatile memory, such as random access memory (RAM) 530 and/or cache memory 532. Computer node 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, system memory 528 may include at least one program product having a set (e.g., at least one) of program modules that are configured to carry out the functions of embodiments of the invention.

Program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer node 512 may also communicate with one or more external devices 514 such as a keyboard, a pointing device, a display 524, etc.; one or more devices that enable a user to interact with computer node 512; and/or any devices (e.g., network card, modem, etc.) that enable computer node 512 to communicate with one or more other computing devices. Such communication can occur via Input/Output (I/O) interfaces 522. Still yet, computer node 512 can communicate with one or more networks such as a local area network (LAN), a general wide area network (WAN), and/or a public network (e.g., the Internet) via network adapter 520. As depicted, network adapter 520 communicates with the other components of computer node 512 via bus 518. It should be understood that although not shown, other hardware and/or software components could be used in conjunction with computer node 512. Examples, include, but are not limited to: microcode, device drivers, redundant processing units, external disk drive arrays, RAID systems, tape drives, and data archival storage systems, etc.

In certain embodiments, the computing device 100 has the architecture of computer node 512. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
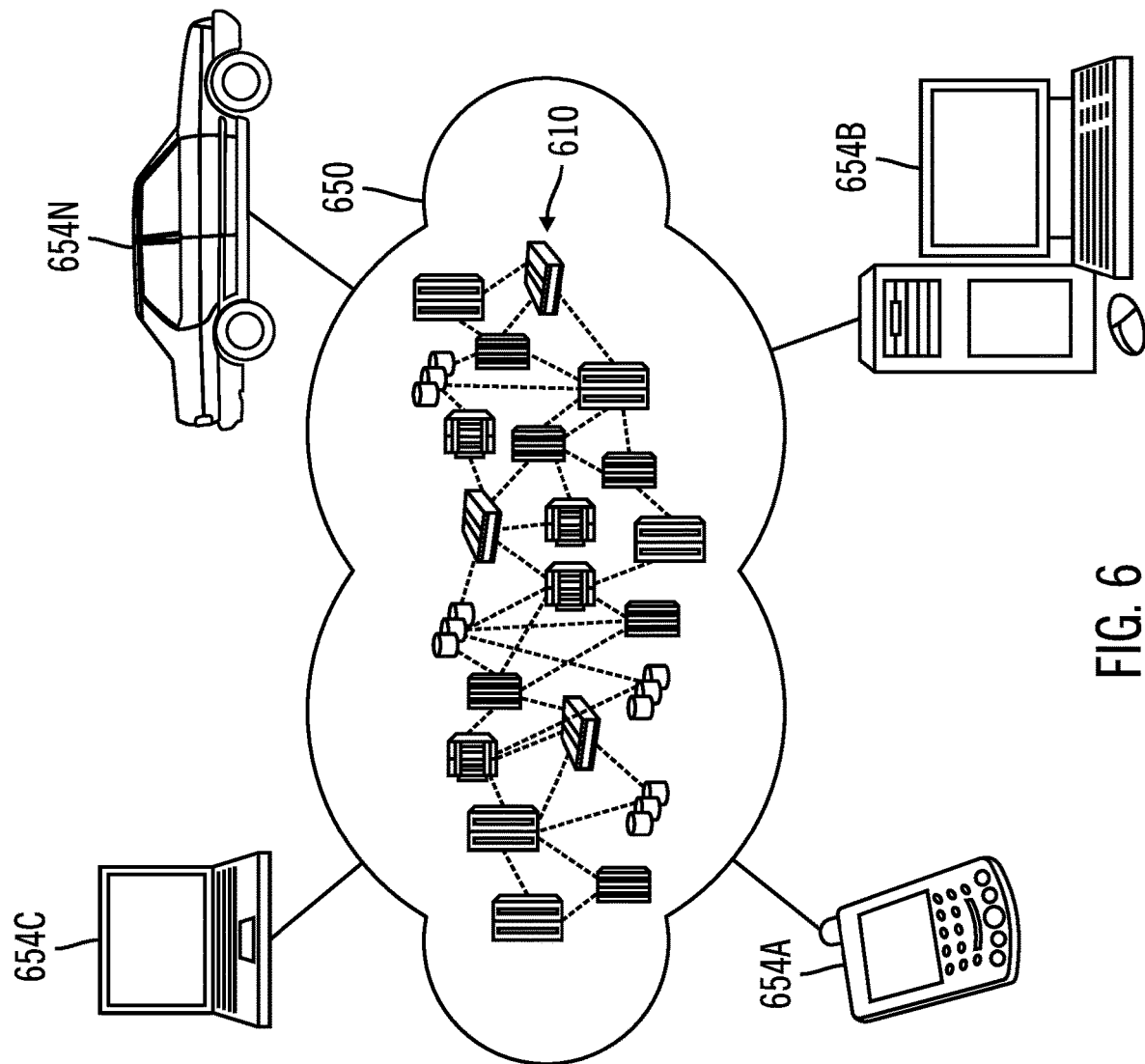
FIG. 6 illustrates a cloud computing environment in accordance with certain embodiments.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
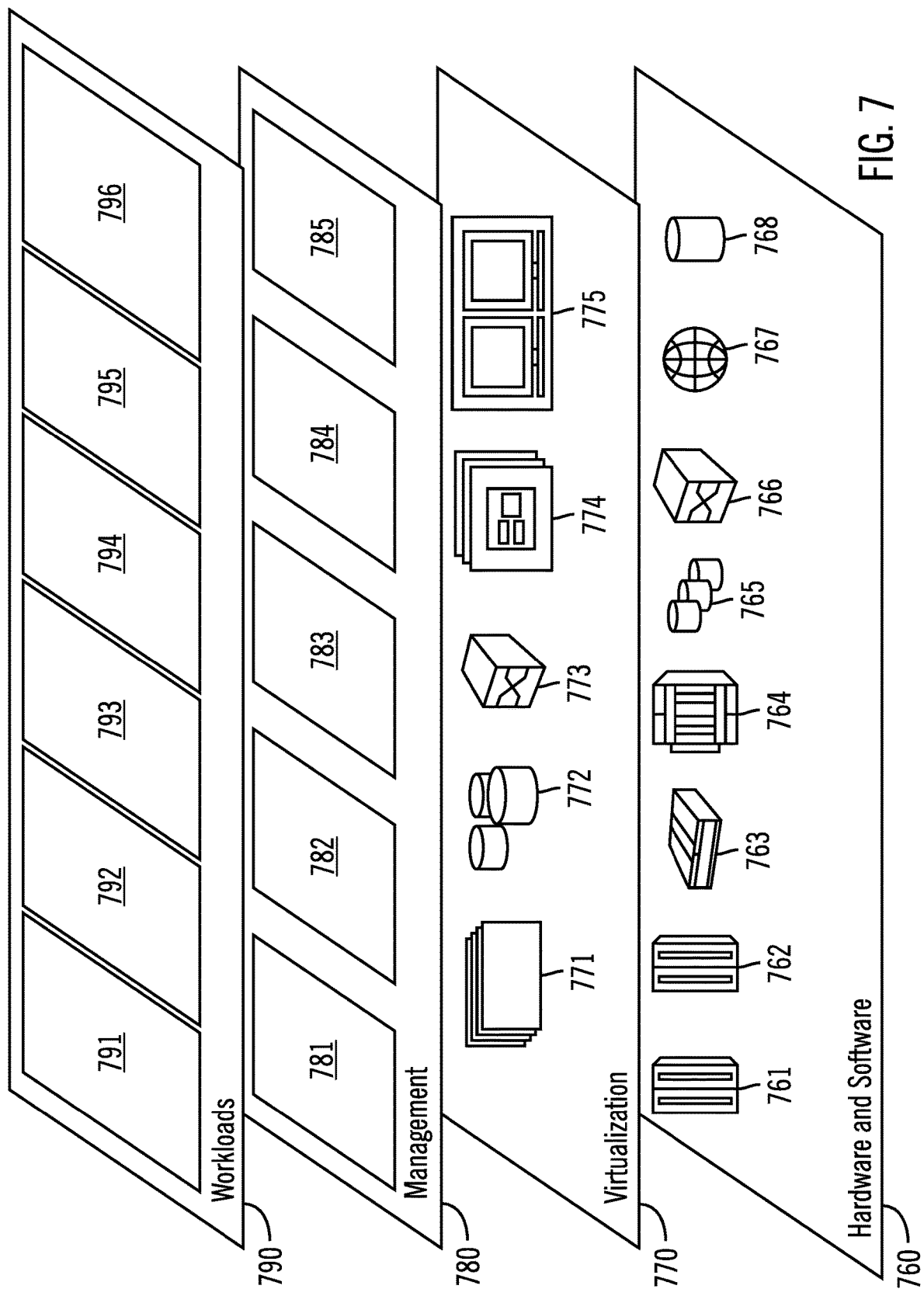
FIG. 7 illustrates abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and using binaries of container images as operating system commands 796.

Thus, in certain embodiments, software or a program, implementing using binaries of container images as operating system commands in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
receiving, by a container engine, metadata describing one or more binaries for a container image, wherein each of the one or more binaries has an associated operating system command;
integrating, by the container engine, the one or more binaries with the container image by placing the one or more binaries into the container image;

injecting, by the container engine, each operating system command into an operating system by adding each operating system command to a command file accessed by the operating system;

receiving, by the container engine, from the operating system, an operating system command that is found by the operating system in the command file and that is associated with a binary of the one or more binaries;

pulling, by the container engine, the container image using the metadata;

executing, by the container engine, the operating system command using the container image with the one or more binaries; and returning, by the container engine, a result.

2. The computer-implemented method of claim 1, comprising further operations for:

using the metadata to map the operating system command to the container image to be pulled.

3. The computer-implemented method of claim 1, wherein the operating system receives the operating system command, finds the operating system command in the command file, and invokes the container engine to execute the operating system command.

4. The computer-implemented method of claim 1, wherein the operating system receives a new operating system command, does not find the new operating system command in the command file, and executes the new operating system command.

5. The computer-implemented method of claim 1, wherein executing the operating system command using the container image comprises executing the binary associated with the operating system command.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations for:

receiving, by a container engine, metadata describing one or more binaries for a container image, wherein each of the one or more binaries has an associated operating system command;

integrating, by the container engine, the one or more binaries with the container image by placing the one or more binaries into the container image;

injecting, by the container engine, each operating system command into an operating system by adding each operating system command to a command the accessed by the operating system;

receiving, by the container engine, from the operating system, an operating system command that is found by the operating system in the command file and that is associated with a binary of the one or more binaries;

polling, by the container engine, the container image using the metadata;

executing, by the container engine, the operating system command using the container image with the one or more binaries; and returning, by the container engine, a result.

8. The computer program product of claim 7, wherein the program code is executable by the at least one processor to perform further operations for:

using the metadata to map the operating system command to the container image to be pulled.

9. The computer program product of claim 7, wherein the operating system receives the operating system command, finds the operating system command in the command file, and invokes the container engine to execute the operating system command.

10. The computer program product of claim 7, wherein the operating system receives a new operating system command, does not find the new operating system command in the command file, and executes the new operating system command.

11. The computer program product of claim 7, wherein executing the operating system command using the container image comprises executing the binary associated with the operating system command.

12. The computer program product of claim 7, wherein a Software as a Service (SaaS) is configured to perform the operations of the computer program product.

13. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

receiving, by a container engine, metadata describing one or more binaries for a container image, wherein each of the one or more binaries has an associated operating system command;

integrating, by the container engine, the one or more binaries with the container image by placing the one or more binaries into the container image;

injecting, by the container engine, each operating system command into an operating system by adding each operating system command to a command file accessed by the operating system;

receiving, by the container engine, from the operating system; an operating system command that is found by the operating system in the command file and that is associated with a binary of the one or more binaries;

puffing, by the container engine, the container image using the metadata;

executing, by the container engine, the operating system command using the container image with the one or more binaries; and returning, by the container engine, a result.

14. The computer system of claim 13, wherein the operations further comprise:

using the metadata to map the operating system command to the container image to be pulled.

15. The computer system of claim 13, wherein the operating system receives the operating system command, finds the operating system command in the command file, and invokes the container engine to execute the operating system command.

16. The computer system of claim 13, wherein the operating system receives a new operating system command, does not find the new operating system command in the command file, and executes the new operating system command.

17. The computer system of claim 13, wherein executing the operating system command using the container image comprises executing the binary associated with the operating system command.

18. The computer system of claim 13, wherein a Software as a Service (SaaS) is configured to perform the operations of the computer system.

\* \* \* \* \*